Feb. 10, 1942.  E. C. MERRY  2,272,572
VEHICLE CONSTRUCTION
Filed Oct. 7, 1938  3 Sheets-Sheet 1
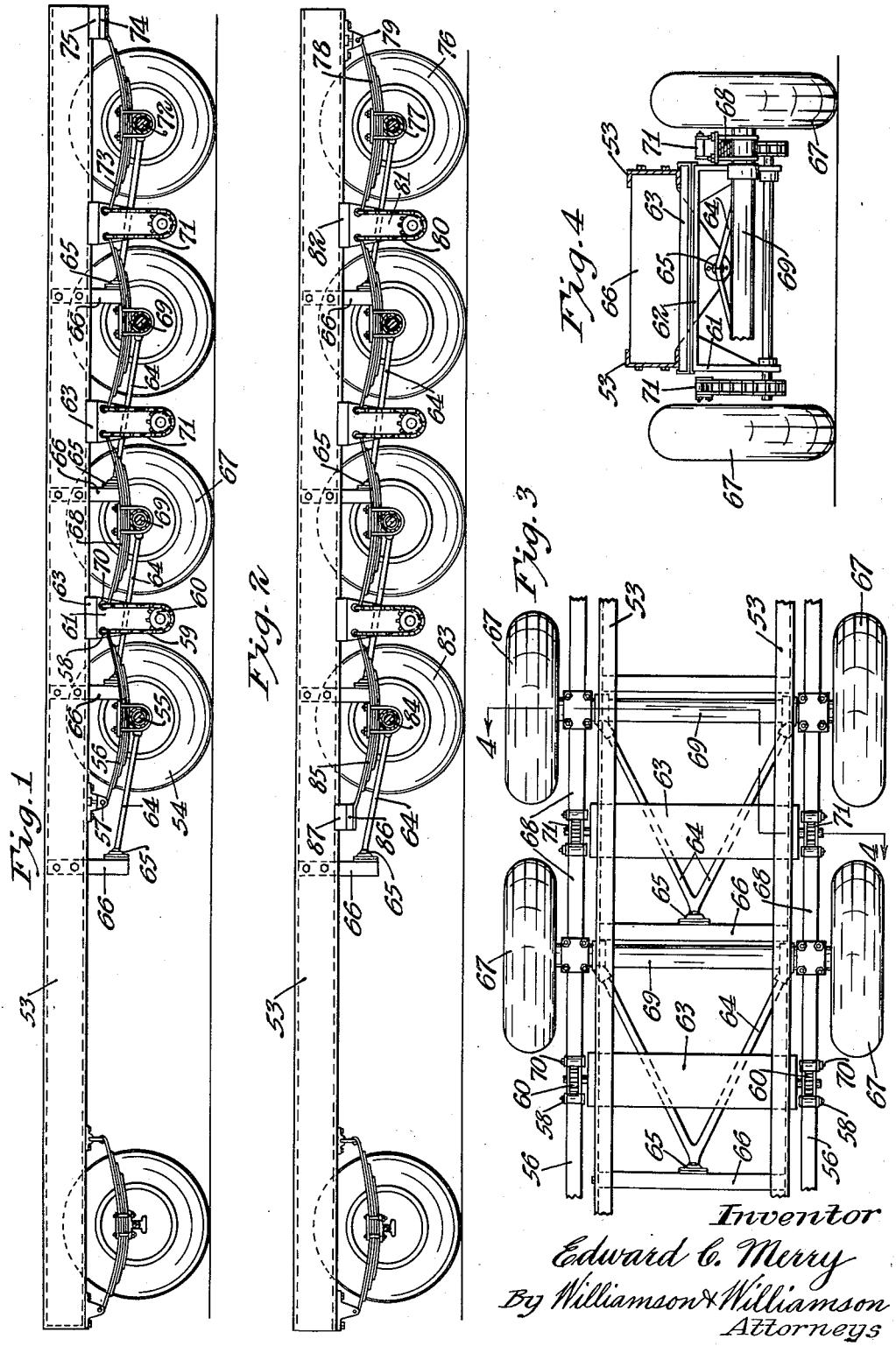
Inventor
Edward C. Merry
By Williamson & Williamson
Attorneys

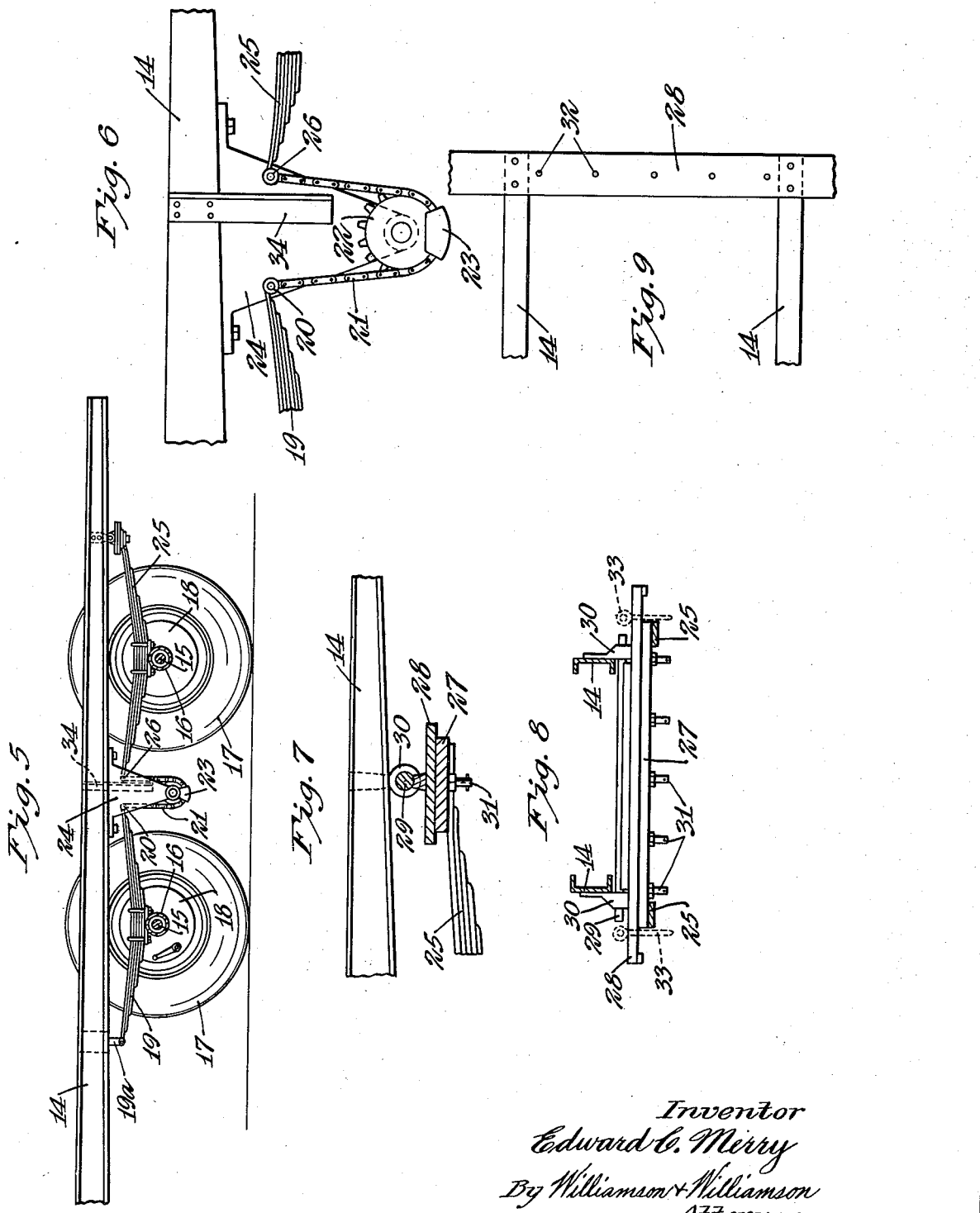

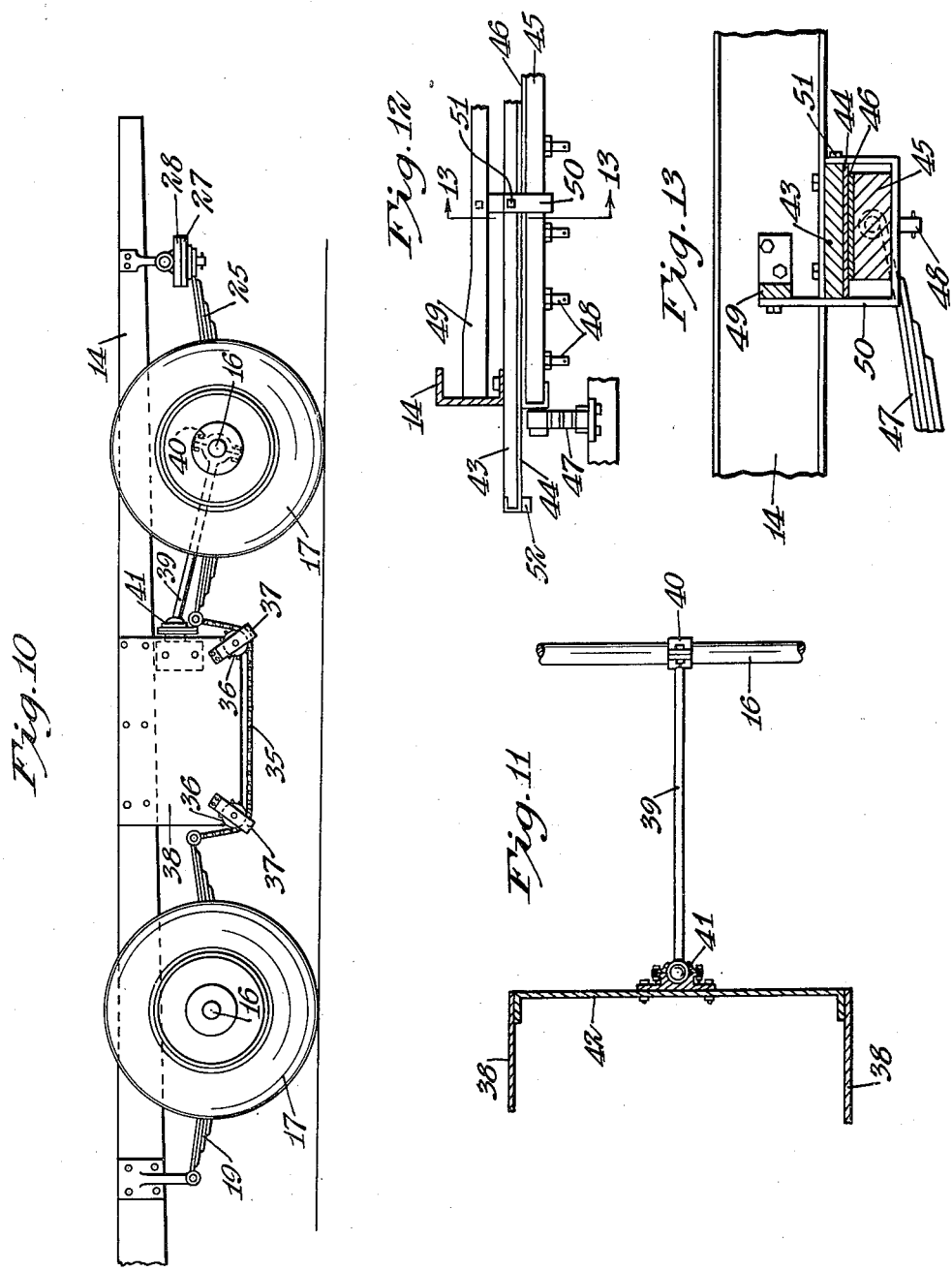

Patented Feb. 10, 1942

2,272,572

UNITED STATES PATENT OFFICE 2,272,572

VEHICLE CONSTRUCTION

Edward Chase Merry, Miles City, Mont., assignor to J. Vernon Neville, Forsyth, Mont.

Application October 7, 1938, Serial No. 233,776

14 Claims. (Cl. 280—124)

This invention relates to vehicle constructions and more particular to automotive vehicles adapted to carry heavy loads.

In the last few years hauling of materials by truck has become more and more developed and larger and heavier truck constructions are being produced from time to time. One difficulty with unusually large truck constructions adapted to carry heavy loads is the inability to meet legal requirements as to maximum loads per axle, and it has been difficult to construct large trucks with two or more axles in such a way that they will safely carry heavy loads and at the same time be comparatively easily handled.

It is, therefore, a general object of my invention to provide a vehicle construction wherein a number of rear axles can be used to safely support heavy loads and at the same time provide a vehicle which can be maneuvered successfully.

Another object of the invention is to provide for a multiple rear axle construction which will permit the use of a nearly indefinite number of axles so that the weight of larger loads can be distributed to cut down the amount of load per axle.

A further object of the invention is the provision of a vehicle construction in which the wheel assemblies are substantially independent of each other and flexibly mounted to permit more or less individual reaction to irregularities in the roadway and also to permit better negotiation of turns.

These and other objects and advantages of the invention will more fully appear from the following description made in connection with the accompanying drawings, wherein like reference characters refer to the same or similar parts throughout the views, and, in which:

Fig. 1 is a side elevation of a truck or trailer chassis with the near wheels removed and the axles in section;

Fig. 2 is a similar view of a re-arranged construction;

Fig. 3 is a fragmentary plan view of the general construction shown in Figs. 1 and 2;

Fig. 4 is a transverse section taken approximately on the line 4—4 of Fig. 3;

Fig. 5 is a modified arrangement of the wheel assembly construction shown in longitudinal vertical section;

Fig. 6 is an enlarged fragmentary showing of a portion of the spring suspension of the construction shown in Fig. 5;

Fig. 7 is a transverse section through the lateral movement assembly shown in Fig. 5 with a portion of a spring and one of the frame members partially in side elevation;

Fig. 8 is a transverse section through the frame showing the lateral movement assembly in side elevation;

Fig. 9 is a fragmentary plan view of the underside of the rear end of the frame and a portion of the lateral motion assembly;

Fig. 10 is a modified form of spring suspension showing portions of the truck in side elevation;

Fig. 11 is a fragmentary plan view showing the radius rod or axle lead rod assembly shown in Fig. 10;

Fig. 12 is a modified fragmentary view of a lateral motion construction; and

Fig. 13 is a section taken approximately on the line 13—13 of Fig. 12.

This application is a continuation in part of my prior issued Patent No. 2,135,906, November 8, 1938, which relates to a multiple rear axle vehicle having a plurality of power plants with drive connections from each of said power plants to independent rear wheel axle assemblies. The construction disclosed and claimed in that patent is particularly advantageous for heavy vehicle constructions.

In the present application the features disclosed relate to wheel assembly connections with the frame of the truck or trailer, as the case may be, and the present disclosed constructions are also particularly advantageous for use in heavy vehicle constructions as stated above. The general form of construction shown in the drawings in this application and the features disclosed and claimed in said above identified application have been incorporated in a gravel carrying automotive vehicle with a gross weight of 65,000 pounds and a pay load capacity of 48,000 pounds. These weights are not given as maximum weights, but are merely set forth to indicate generally the type of truck construction to which my invention is adapted. With such loads it is possible to transport gravel and other materials over long distances at considerably less cost than is required for transportation wherein materials are sometimes loaded from smaller trucks to railway cars for overland transportation and then transferred from the railway cars to trucks for transportation from the railway yards to the ultimate destination.

In Fig. 5 there is shown portions of truck side frame members 14 of conventional structure, an axle 15 and an axle housing 16. Wheels 17 and conventional brakes 18 are shown carried by the axles and housings.

The forward leaf spring 19 is shown secured to the axle housing by the usual saddle bolts, the forward end of said spring being connected by any desired type of spring shackle 19a to the frame member 14. The rear end of said spring 19 is pivotally connected at 20 to one end of a chain 21 which extends downwardly around a sprocket 22 which may have a guard 23, and said sprocket is rotatably secured on a bracket 24 which as is shown is connected to and extends downwardly from the frame member 14. The other spring 25 shown in Fig. 5 has its forward end pivotally secured at 26 to the opposite end of the chain 21, said spring 25 being secured to its axle housing by saddle bolts in the same manner as the first described spring 19.

The rear end of the spring 25 is connected to a substantially flat plate 27 which extends across the vehicle from one side frame member to the other although said plate is not connected to said frame members. Resting upon the plate 27 is a cooperating slide plate 28 which carries a bar 29, the latter having its ends mounted in suitable journals 30 which are secured to the side frame members 14. The lower slide plate 27 may be provided with fittings 31 to permit the introduction of a lubricant between the two slide plates, the lubricant passing up through openings 32 in the lower slide plate such as indicated in Fig. 9. In some cases when desired the two plates can be held against relative sliding movement by inserting stop pins 33 through suitable apertures in the upper plate adjacent the ends of the lower plate.

The above described combination of a flexible link connection with a lateral movement slide plate assembly clearly facilitates proper handling of a heavy vehicle of this type. Naturally when one of the wheels 17 hits a bump or depression in the roadway the flexible connection 21 between the spring ends will permit one wheel to either rise or fall while the other will work in the opposite direction to compensate for the movement of the leading wheel. This will cause all of the wheels to remain in firm engagement with the roadway so that there will be no loss of power or wearing of tires due to wheel slippage. The slide plate assembly permits lateral movement of the wheel assembly to which it is connected to assist in negotiating turns. Should it happen that the following wheel assembly shown in Fig. 5 should be moved laterally with respect to the frame when negotiating a turn, and should either of the wheel assemblies strike a sharp bump or depression said following wheel assembly might leave the ground due to the close positioning of the two wheel assemblies, and if it were not for the flexible link connection between the ends of adjacent springs to keep both of the wheel assemblies in firm contact with the ground the slidable assembly would be very likely to shift in either direction laterally and possibly throw the vehicle out of control. Thus there is close relationship between the flexible spring connection 21, which may be chain, cable or other suitable material, and the lateral motion or slide plate construction.

There is shown in Figs. 5 and 6 a piece of angle iron 34 extending downwardly from the side frame 14 a short distance in front of the connection 26 at the forward end of the rear spring. Let us assume that the rear spring 25 is mounted upon a driving axle which, of course, would be connected to the power plant of the vehicle. When starting with the sudden application of considerable power the rearward axle would tend to drive forwardly with respect to the frame and because of the slip plate construction at one end of the spring 25 and the flexible link connection at the other end, there would be nothing to prevent said rear wheel assembly from moving forwardly. To guard against disengagement of the cooperating slip plates 27 and 28 the angle iron 34 provides an abutment which limits this possible forward movement of the rear wheel assembly.

In Fig. 10 there is shown a construction in which the wheels 17 and axles 16 are spaced considerably further apart than in Fig. 5. Naturally the forward spring 19 will also be spaced a considerable distance further away from the rear spring 25. The adjacent ends of the springs 19 and 25 are connected by a flexible link connection 35 which in the drawings is shown to be a chain, said chain riding on sprockets 36 which are rotatably mounted in supports 37, the latter being carried by side plates 38 which are secured to the frame members 14. In Fig. 10 the rearmost axle 16 is not shown as connected to any source of power but can if desired. The slip plates 27 and 28 are the same as those shown in Figs. 5 and 7. To prevent too much forward or rearward motion of one slip plate relative to the other in the construction shown in Fig. 10 I provide a radius rod or axle lead rod 39 which is connected by a clamp 40 to the rear axle 16 and by a ball joint 41 to a plate 42 which is suitably supported from the frame elements 14 and connects the side plates 38.

In Fig. 12 there is shown a modified form of slide plate construction. The frame members 14 have secured thereto a transversely positioned upper slide plate member 43 which has secured to its under surface a wear plate 44. The lower slide plate element 45 has a wear plate 46 on its upper surface in contact with the wear plate 44. A spring 47 of the conventional leaf type is pivotally connected to the end of the lower slide plate 45 as is indicated in the drawings. Lubricating connections 48 are also provided as in the other slide plate construction previously described. A bar 49 extends between the side frame members 14 and carries a substantially J-shaped strip element 50 which extends downwardly around the lower slide plate and thence upwardly where it is secured to the opposite edge of the upper side plate at 51. It will be noted that the upper slide plate 43 is of greater width than the lower plate 45 so that the strip 50 will permit limited forward or rearward movement of one slide plate relative to the other. A downward projection 52 on each end of the upper slide plate 43 is provided to limit the relative lateral movement of one slide plate to the other.

In Figs. 1 through 4 there is shown a more or less diagrammatic layout of a truck or trailer frame 53 in which the forward or left-hand wheel and spring assembly shown in Figs. 1 and 2 is conventional and may or may not be constructed for steering. In Fig. 1 the wheel 54 is mounted on a suitable axle 55 and a spring 56 is secured at its forward end to the frame by a universally jointed shackle 57. The rear end of the spring 56 is connected at 58 to one end of a flexible link element 59, the latter riding on a sprocket or pulley 60 which is rotatably mounted upon a bracket 61. The upper portion of the bracket 61 constitutes the upper surface of a lower slide plate 62 as best shown in Figs. 3 and 4 and an upper slide plate element 63 is rigidly secured transversely of the vehicle frame 53. A V-shaped radius rod or lead rod 64 has its free ends connected to the axle 55 and its forward point connected by a ball joint 65 to a member 66 which is rigidly secured across the frame 53. The respective wheel assemblies indicated generally at 67 include a spring 68 mounted on an axle 69 and the forward end of the spring 68 is connected not to a shackle as in the case of the spring 56 but is secured at 70 to the opposite end of the flexible link 59 thus connecting adjacent ends of springs 56 and 68. The rear end of the spring 68 is connected to a second flexible link assembly indicated generally at 71 and a second lead or radius rod 64 connects the axle 69 to another member 66 which is supported by the frame.

The construction of the second wheel suspension is repeated on succeeding wheel assemblies until the rearmost assembly is reached. In the latter case the axle 72 carries a spring 73 whose forward end is connected to one of the flexible link connections 71 but whose rearward end is connected to a lower slip plate 74 which cooperates with an upper slip plate 75, the latter being rigidly secured transversely of the frame 53.

In the assembly shown in Fig. 1 it will be seen that the small axle of the group of wheel assemblies and the entire wheel assembly itself is a relatively fixed assembly, while the respective three succeeding wheel assemblies are entirely connected to the frame by means of slip plates at both ends of their respective springs and axle leads or radius rods 64 which, as above described, are connected to the frame by means of ball joints. Thus in turning, the leading wheel assembly of the group (which carries the wheel 54) acts as a fulcrum, and as a turn is made to the left that portion of the frame forward of the wheel 54 will swing generally toward the left while the portion of the frame rearwardly of the wheel 54 will have a tendency to swing outwardly or toward the right with respect to the relatively fixed leading wheel assembly of the group. Since the succeeding wheel assemblies are what might be termed "full floating," these assemblies will not so quickly follow the movement of the frame at the rear portion thereof and will have the appearance of extending inwardly or to the left of the frame. The second wheel assembly will, of course, shift laterally of the frame only a small degree while the rearmost wheel assembly will have considerable shifting movement, and naturally the wheel assembly next to the rear will have a more or less intermediate shifting movement. The result is that the wheel assemblies will track substantially in the path of the wheels 54 which lead the group. After the turn has been negotiated the lead rods or radius rods 6b will cause the wheel assemblies to come back into proper alignment.

In Fig. 2 the rearmost wheel 76 is carried by an axle 77 and a spring 78 is secured to the latter. The rear end of the spring 78 is connected to the frame 53 by a universally jointed shackle connection 79 and the forward end of said spring is secured to a flexible link connection 80 of the same general construction as those described in Fig. 1. The upper flat portion of the bracket 81 similar to those in Fig. 1 serves as a lower slide plate and an upper slide plate 82 is secured to the frame in the same manner as described above. The wheel assemblies which precede the rearmost wheel assembly are "full floating" assemblies such as the ones described in connection with Fig. 1, and the foremost wheel 83 is on an axle 84 which carries a spring 85 the forward end of which is connected to a lower slide plate 86 which cooperates with an upper slide plate 87 connected to the frame.

The construction in Fig. 2 is a reverse arrangement to that shown in Fig. 1. In other words the rearmost wheel assembly is the relatively fixed assembly and those preceding it are what might be termed "full floating." As the vehicle describes a left turn there will be no relatively fixed wheel intermediate the ends of the frame to act as a fulcrum since the fixed wheel is at the rear. Therefore, the entire frame will have a tendency to swing toward the left with a point at the rear of the frame acting as the pivot therefor. In describing a turn with such an arrangement the foremost wheel 83 in the group of wheel assemblies will move outwardly and laterally with respect to the frame a considerable distance and the next succeeding intermediate wheel assemblies will move outwardly or to the right relative to the frame in diminishing proportion.

In all of the lateral movement actions described in this application there is, of course, some slightly arcuate movement of some slip plate relative to the other although for slightly shifting movement the slip plates may move relative to each other in substantially a straight line. Regardless, however, of whether the shifting movement is appreciably arcuate or substantially transversely of the vehicle, my slip plate construction permits either movement or the combination of the two since it involves the sliding abutment of two flat surfaces.

From the foregoing description it will be seen that I have provided a wheel and axle suspension particularly for extremely heavy vehicles in which a plurality of relatively closely positioned rear wheel assemblies can be utilized and in which the utmost flexibility of movement is acquired in taking the vehicle around a turn. My general ideas of construction permit the use, theoretically, of an unlimited number of rear wheel and axle assemblies so that trucks of enormous load capacity can be not only constructed but successfully operated. Furthermore, while there is, of course, considerable duplication of parts in a multiple axle group, the construction is comparatively simple and has proven to be extremely sturdy. This construction used in connection with the features in the above identified co-pending application provides a truck assembly which, as has been pointed out, can be used to haul enormous loads at low cost when compared to combined truck and railroad material handling.

While I have described several desired forms of my invention, it will, of course, be understood that various changes may be made in the form, details, arrangement and proportions of the various parts without departing from the scope of my invention.

What is claimed is:

1. In a multiwheel vehicle construction, a chassis frame comprising substantially parallel side members extending substantially throughout the length of the vehicle, a plurality of substantially identical wheel assemblies comprising axles, wheels on said axles, springs secured intermediate their ends to said axles, the ends of the spring of one wheel assembly terminating adjacent the ends of springs of adjacent wheel assemblies, flexible link connections between said adjacent spring ends, a substantially flat slide plate extending across said chassis frame and secured thereto against relative lateral and vertical movement, and a complementary slide plate connected to at least one of said wheel assemblies and in slidable contact with said first mentioned slide plate.

2. In a vehicle construction, a chassis frame, a plurality of wheel assemblies comprising axles, wheels on said axles and springs secured intermediate their ends to said axles and a slide device extending across said frame substantially midway between adjacent axles and comprising complementary relatively movable portions, one of which is secured to said chassis frame and the other of which is secured to said wheel assembly.

3. In a vehicle construction, a chassis frame, a plurality of wheel, axle and spring assemblies, flexible connections between the adjacent ends of adjacent springs, one end of one of said springs being directly connected to said frame in non-slidable relationship thereto, a lateral movement device secured against vertical movement relative to said chassis frame adjacent the end of the spring located farthest from said directly connected spring and said farthest located spring being connected to said lateral motion device, whereby sliding movement of the wheel, axle, and spring assembly which is connected to said lateral motion device is permitted.

4. In a vehicle construction, a frame, a plurality of wheel assemblies, comprising axles, wheels thereon and springs connected to each of said axles, flexible connections between adjacent portions of springs in adjacent wheel assemblies, supports for said flexible connections rigidly secured to said frame, the spring for one of said wheel assemblies being connected to said frame in nonsliding relationship thereto and another of said wheel assemblies having a spring whose end is connected directly between said frame and the axle of said assembly in slidable relationship to said frame.

5. The structure in claim 4 and a radius rod connected between said slidable wheel assembly and said frame.

6. In a vehicle construction, a chassis frame, a wheel assembly comprising, an axle, wheels on said axle and springs secured to said axle, a second wheel assembly spaced from said first wheel assembly, means for securing the springs of one of said assemblies against lateral movement relative to said frame, laterally movable means for securing the springs of said other assembly to said frame, a pair of spaced pulley elements supported by said frame between said wheel assemblies, and flexible connections between adjacent ends of the springs of said spaced wheel assemblies, the pulley elements on said frame resting upon said flexible connection.

7. In a vehicle construction, a frame, a plurality of wheel assemblies comprising axles having wheels thereon and springs secured to said axles, the foremost of said wheel assemblies having a vertically pivoted connection between its spring and said frame to permit limited lateral movement of said wheel assembly relative to said frame, and the remainder of said wheel assemblies being relatively freely slidably secured to said frame.

8. In a vehicle construction, a frame, a plurality of wheel assemblies comprising axles having wheels thereon and springs secured to said axles, the rearmost of said wheel assemblies having a substantially rigid connection between its spring and said frame to prevent lateral movement of said wheel assembly relative to said frame, and the remainder of said wheel assemblies being slidably secured to said frame whereby all but the rearmost of said wheel assemblies can shift laterally relative to said frame.

9. In a vehicle construction, a frame, a plurality of wheel assemblies comprising axles having wheels thereon and springs secured to said axles, the springs of adjacent wheel assemblies having flexible connections, a plurality of lateral movement slide elements positioned adjacent certain of at least some of said wheel assemblies, said slide elements comprising cooperating relatively slidable portions, a first portion of each of said slide elements being rigidly secured to said frame, and a second cooperating portion of each of said slide elements being connected to said flexible connection.

10. The structure in claim 9 and said second portion of said slide means being movably connected to the connection between said adjacent springs.

11. The structure in claim 9 and rods extending from at least some of said axles to said frame, the connection between said rods and said frame being freely movable.

12. In a vehicle construction, a chassis frame, a plurality of wheel assemblies comprising, axles, wheels on said axles, springs secured intermediate their ends to said axles, a slide device extending across said frame substantially midway between and adjacent said axles and comprising complementary relatively movable portions, one of which is substantially rigidly secured to said chassis frame and the other of which is secured to one of said wheel assemblies, and means for locking said relatively movable portions against movement.

13. In a vehicle construction, a chassis frame, a wheel assembly comprising an axle, wheels on said axle and springs secured to said axle, a second wheel assembly spaced from said first assembly and having springs secured thereto, means for securing the springs of one of said assemblies against relatively great lateral movement with respect to said frame, means for connecting the springs of said other assembly to said frame for relatively greater lateral movement with respect to the frame, a pair of spaced pulley elements supported by said last mentioned means between said wheel assemblies, and flexible connections between the adjacent ends of the springs of said assemblies, said pulley elements resting upon said flexible connections.

14. In a vehicle construction, a frame, a plurality of wheel assemblies comprising, axles, wheels thereon and springs connected to each of said axles, flexible connections between adjacent portions of said springs in adjacent wheel assemblies, supports for said flexible connections rigidly secured to said frame, the spring for one of said wheel assemblies being connected to said frame in non-sliding relationship thereto, another of said wheel assemblies having a spring whose end is connected to said frame in transverse and longitudinal slidable relationship thereto, and said last mentioned spring lying substantially longitudinally of said frame, and abutment means on said frame spaced in longitudinal alignment with at least one end of said last mentioned spring to prevent excessive longitudinal movement of said last mentioned wheel assembly.

EDWARD CHASE MERRY.